United States Patent
Groezinger

(10) Patent No.: US 6,997,495 B1
(45) Date of Patent: Feb. 14, 2006

(54) MOBILE ASSEMBLY HALL

(76) Inventor: Marlo Groezinger, 6668 Pearl City Rd., Freeport, IL (US) 61032

( * ) Notice: Subject to any disclaimer, the term of this patent is extended or adjusted under 35 U.S.C. 154(b) by 0 days.

(21) Appl. No.: 10/920,096

(22) Filed: Aug. 17, 2004

(51) Int. Cl.
B62C 1/06 (2006.01)
(52) U.S. Cl. .................................. 296/26.15
(58) Field of Classification Search ............ 296/26.15, 296/24.3, 24.32, 24.33, 24.39, 26.01, 156–176
See application file for complete search history.

(56) References Cited

U.S. PATENT DOCUMENTS

| | | | |
|---|---|---|---|
| 458,738 A | 9/1891 | Palwen | |
| 2,706,132 A | 4/1955 | Chaffin | |
| 2,860,384 A * | 11/1958 | Wait et al. ...................... | 52/69 |
| 3,255,686 A | 6/1966 | Larson et al. | |
| 3,708,198 A * | 1/1973 | Coons ......................... | 296/162 |
| 4,135,755 A * | 1/1979 | Steffens .................... | 296/26.15 |
| 4,188,057 A * | 2/1980 | Pauli ........................... | 296/162 |
| 4,270,319 A | 6/1981 | Spasojevic | |
| 4,534,141 A * | 8/1985 | Fagnoni ......................... | 52/68 |
| 4,601,509 A | 7/1986 | Ellis, Sr. | |
| 4,869,030 A * | 9/1989 | Clark .......................... | 52/79.6 |
| D339,870 S | 9/1993 | Carlin | |
| 5,285,604 A | 2/1994 | Carlin | |
| 5,375,899 A * | 12/1994 | Wright .......................... | 296/21 |
| 5,596,844 A * | 1/1997 | Kalinowski .................. | 52/79.5 |
| 5,706,616 A * | 1/1998 | Fernandez .................... | 52/143 |
| 5,761,854 A * | 6/1998 | Johnson et al. ................ | 52/69 |
| 5,833,295 A | 11/1998 | Farlow, Jr. | |
| 6,223,479 B1 * | 5/2001 | Stockli .......................... | 52/68 |
| 6,243,992 B1 * | 6/2001 | Gyllenhammar ............... | 52/64 |
| 6,393,769 B1 * | 5/2002 | Mertik et al. ..................... | 52/7 |
| 6,712,414 B1 * | 3/2004 | Morrow .................... | 296/26.01 |
| 2004/0108750 A1 * | 6/2004 | Park ........................... | 296/156 |

\* cited by examiner

*Primary Examiner*—H. Gutman
(74) *Attorney, Agent, or Firm*—Craig A. Fieschko, Esq.; DeWitt Ross & Stevens S.C.

(57) ABSTRACT

A trailer, such as a conventional full trailer or semi trailer used for hauling freight, is convertible into an assembly hall by folding its sidewalls upwardly to define ceiling extensions extending from the trailer roof. Additional floor extensions which are pivotally affixed to the sides of the trailer floor may then be folded downwardly in substantially parallel relation to the trailer floor to define an assembly hall floor. The floor extensions fold in nested relation between the folding trailer sidewalls/ceiling extensions such that the entire arrangement fits within the same space envelope as the conventional trailer. Once unfolded, the trailer may be used as a shelter/assembly hall for meetings and other events, and may be provided with interior seating, safety railings, and other enhancements.

24 Claims, 2 Drawing Sheets

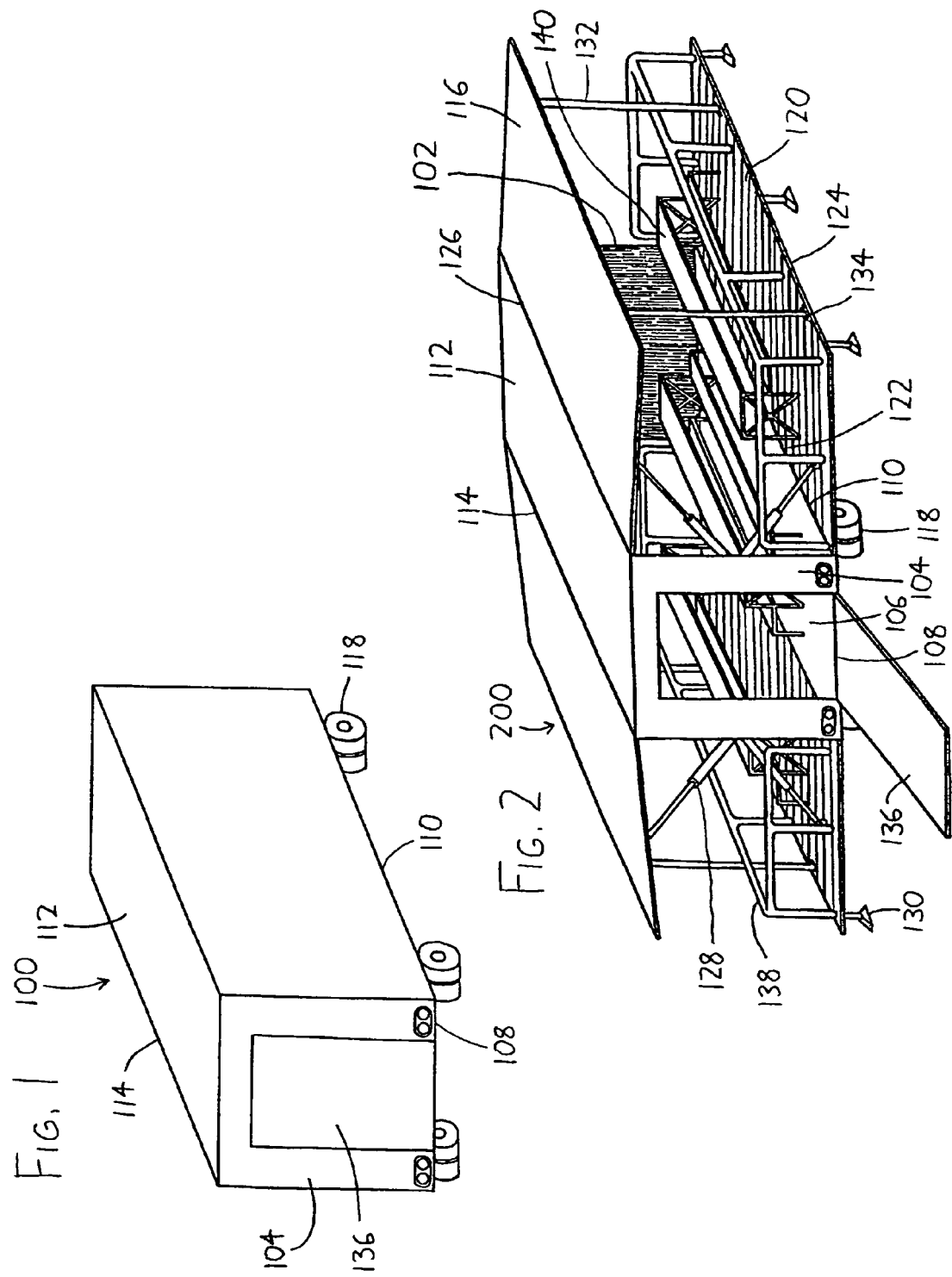

MOBILE ASSEMBLY HALL

FIELD OF THE INVENTION

This document concerns an invention relating generally to portable shelters, and more specifically to portable shelters usable by assemblies of numerous people for group activities.

BACKGROUND OF THE INVENTION

Civic organizations, businesses, and other groups often conduct activities at temporary facilities, generally in tents. As an example, at county fairs and local festivals, charities and clubs may erect a tent and conduct bingo games, raffles, and the like therein. As another example, in order to generate consumer interest, businesses sometimes conduct sales, auctions, informational seminars, or other commercial activities in tents located away from their ordinary business locations.

One problem with the use of tents as temporary shelters is the time, effort, and skill needed to erect a large tent. Large tents can be difficult to erect, and often require several physically strong people to erect them. In some cases, there may be severe time constraints on the construction and take-down of the tent owing to factors such as permit requirements and/or the requirements of the groundskeeper (e.g., park opening and closing times, daily bookings of the same space to different parties, etc.). Thus, the time required to assemble and take down a tent may severely reduce the time available for their planned activity. Further, some locations simply aren't suitable for tents. As an example, where activities are to be held in paved areas, it may not be permissible to drive tent stakes or other anchors into the pavement, thereby preventing use of a tent.

Owing to the foregoing difficulties, many group activities are simply conducted in the open air by use of booths/tables, grandstands, and the like. In these cases, the exposure to the elements—e.g., the heat of the sun—may then make the activities unappealing or unacceptable to some people, particularly to the elderly and to young children. There is therefore a need for an improved form of shelter/assembly hall which can be brought to the site of an activity, set up, and later removed, all with minimal time, effort, personnel, and expense.

SUMMARY OF THE INVENTION

The invention, which is defined by the claims set forth at the end of this document, is directed to a mobile assembly hall in the form of a trailer that may be moved to a desired location and converted into the assembly hall, and may later be converted back into the trailer for transport and use at another location. A basic understanding of some of the preferred features of the invention can be attained from a review of the following brief summary of the invention, with more details being provided elsewhere in this document. To better assist the reader's understanding, the following summary is provided with reference to the exemplary preferred version of the mobile assembly hall depicted in the accompanying drawings.

The mobile assembly hall is formed of a trailer 100 (see FIG. 1), such as a conventional freight trailer hauled behind a tractor truck. The trailer 100 has a trailer front wall 102 (visible in FIG. 2); an opposing trailer rear wall 104; an at least substantially horizontal trailer floor 106 (also in FIG. 2) with a front end (not clearly visible in the drawings) and an opposing rear end 108, and with opposing trailer floor sides 110 which extend between the trailer front wall 102 and trailer rear wall 104; a trailer roof 112, having roof sides 114 extending between the trailer front wall 102 and trailer rear wall 104; and trailer sidewalls 116 which extend between the trailer front wall 102 and trailer rear wall 104, and also between the trailer roof 112 and trailer floor 106. Wheels 118 are provided beneath the trailer floor 106 to allow the trailer 100 to be rolled between different locations (generally by towing it behind a tractor truck).

To convert the trailer 100 into the assembly hall 200 shown in FIG. 2, the trailer sidewalls 116 are pivoted into an unfolded state wherein the trailer sidewalls 116 are oriented at least substantially horizontally. The trailer sidewalls 116 may be pivotally affixed to the roof sides 114, in which case unfolding the trailer sidewalls 116 converts the trailer sidewalls 116 into trailer ceiling extensions 116 which extend outwardly from the trailer roof 112, thereby defining a continuous assembly hall roof in conjunction with the trailer roof 112. Alternatively, in a different version of the invention not shown in the drawings, the trailer sidewalls 116 may be pivotally affixed to the floor sides 110, in which case unfolding the trailer sidewall 116 converts the trailer sidewalls 116 into trailer floor extensions 120 which extend horizontally outwardly from the trailer floor 106 to define a continuous floor in conjunction with the trailer floor 106.

In the version of the invention depicted by the drawings (particularly FIG. 2), trailer floor extensions 120 are provided wherein each trailer floor extension 120 has an inner side 122 and an opposing outer side 124, with the inner side 122 being pivotally mounted to one of the trailer floor sides 110. Each trailer floor extension 120 is then pivotable between folded and unfolded states. When a trailer floor extension 120 is in its unfolded state, the trailer floor extension 120 extends laterally outwardly from, and at least substantially horizontally adjacent to, the trailer floor 106, so that the trailer floor extension 120 and trailer floor 106 combine to define a continuous horizontal assembly hall floor. In the folded state, the outer side 124 of the trailer floor extension 120 is pivoted at least 80 degrees inwardly toward the trailer floor 106 from the unfolded state.

Similarly, the aforementioned folding trailer sidewalls 116 (i.e., the trailer ceiling extensions 116) each have an inner side 126 pivotally mounted to one of the trailer roof sides 114 so that it may pivot to an unfolded state wherein the ceiling extension 116 extends laterally outwardly from the trailer roof 112, in an at least substantially horizontal orientation wherein each ceiling extension 116 rests above one of the trailer floor extensions 120 when that trailer floor extension 120 is in its unfolded state. Each sidewall/trailer ceiling extension 116 may also pivot to a folded state wherein the ceiling extension 116 is folded at least 80 degrees inwardly toward the trailer roof 112 from the unfolded state to extend between the trailer ceiling and the trailer floor 106. When the trailer floor extensions 120 and trailer ceiling extensions 116 are each in their folded states, the folded trailer floor extensions 120 rest between (and at least substantially parallel to) the folded trailer ceiling extensions 116 (i.e., between the trailer sidewalls 116), and thus the folded assembly hall 200 has the appearance of a common trailer 100. While the folding of the trailer sidewalls 116 and ceiling/floor extensions 116 and 120 could be performed manually, owing to their weight, the mobile assembly hall preferably includes fluid actuators 128 (i.e., pneumatic or hydraulic cylinders) which extend from the ceiling and floor extensions 116 and 120 to at least one of the trailer front wall 102 and the trailer rear wall 104, and which may be actuated to convert the ceiling and floor extensions 116 and 120 between their folded and unfolded states. Pneumatic cylinders are preferred for use as the fluid actuators 128, since these may make use of the compressed air supply provided by standard tractor trucks.

To help support the trailer floor extensions 120 in their unfolded states with the floor extensions 120 situated horizontally adjacent to the trailer floor 106, the floor extensions 120 preferably include legs 130 which extend downwardly to support the floor extensions 120 above the ground when the floor extensions 120 are in their unfolded states. These legs 130 may conveniently be pivotally mounted to the floor extensions 120 so that they fold parallel to the floor extensions 120 when the floor extensions 120 are in their folded states, and so that they unfold to extend substantially vertically from the floor extensions 120 to the ground when the floor extensions 120 are unfolded.

To help support the trailer ceiling extensions 116 in their unfolded states with the ceiling extensions 116 situated at least substantially horizontally adjacent the trailer roof 112, struts 132 may be installed which extend downwardly from the ceiling extensions 116 to the floor extensions 120, thereby forming supporting stanchions. Preferably, opposing pairs of pockets 134 are defined in the floor and ceiling extensions 116, with these pockets 134 facing each other when the floor and ceiling extensions 116 are unfolded. The ends of the struts 132 may then be placed in the pockets 134 to fix the struts 132 between the ceiling and floor extensions 116 and 120 and maintain them in spaced relation. It is also possible to pivotally affix struts 132 to one of the floor extensions 120 and the ceiling extensions 116, and define pockets 134 in the other, so that (for example) the struts 132 may be pivoted upwardly from the floor extensions 120 to rest within corresponding pockets 134 in the ceiling extensions 116, or alternatively the struts 132 may be pivoted downwardly from the ceiling extensions 116 to rest within corresponding pockets 134 in the floor extensions 120.

To allow easy and safe access to the floor of the assembly hall 200, a folding ramp 136 is preferably formed on at least a portion of the trailer rear wall 104 so that the ramp 136 may fold downwardly to the ground to allow people to walk up to the assembly hall floor (i.e., to the trailer floor 106 and its adjacent floor extensions 120). The floor extensions 120 preferably bear railings 138 which bound at least a portion of the perimeters of the floor extensions 120, with the railings 138 being defined by elongated beams spaced above the floor extensions 120. These railings 138 preferably remain in fixed relation to the floor extensions 120 so that the railings 138 simply fold into the interior of the trailer 100 when the floor extensions 120 are pivoted into the folded state, though the railings 138 could instead be removable, or could fold against the floor extensions 120.

To better make the assembly hall 200 ready for immediate use when it is unfolded from the trailer 100, it is also useful to provide platforms 140 situated upon (and spaced horizontally above) the trailer floor extensions 120 when the trailer floor extensions 120 are in their unfolded states. These platforms 140, which are sized and configured to define seats, may remain fixed to each trailer floor extension 120 when it is pivoted between its folded and unfolded states so that they are immediately usable once the floor extension 120 is unfolded.

The mobile assembly hall 200 is particularly useful where activities are to take place at areas where no other shelter exists (e.g., at ballfields, fairgrounds, parks, and the like), and can be used for a variety of activities, such as fundraisers (e.g., bingo games), social meetings (e.g., potluck dinners), auctions and sales presentations (e.g., insurance seminars), and political meetings (e.g., voter drives and rallies).

Further advantages, features, and objects of the invention will be apparent from the following detailed description of the invention in conjunction with the associated drawings.

BRIEF DESCRIPTION OF THE DRAWINGS

FIG. 1 is a rear perspective view of a basic version of the mobile assembly hall, showing the trailer 100 prior to its conversion.

FIG. 2 is a rear perspective view of the trailer of FIG. 1 unfolded to convert it into the assembly hall 200.

DETAILED DESCRIPTION OF PREFERRED VERSIONS OF THE INVENTION

Figure 3A:
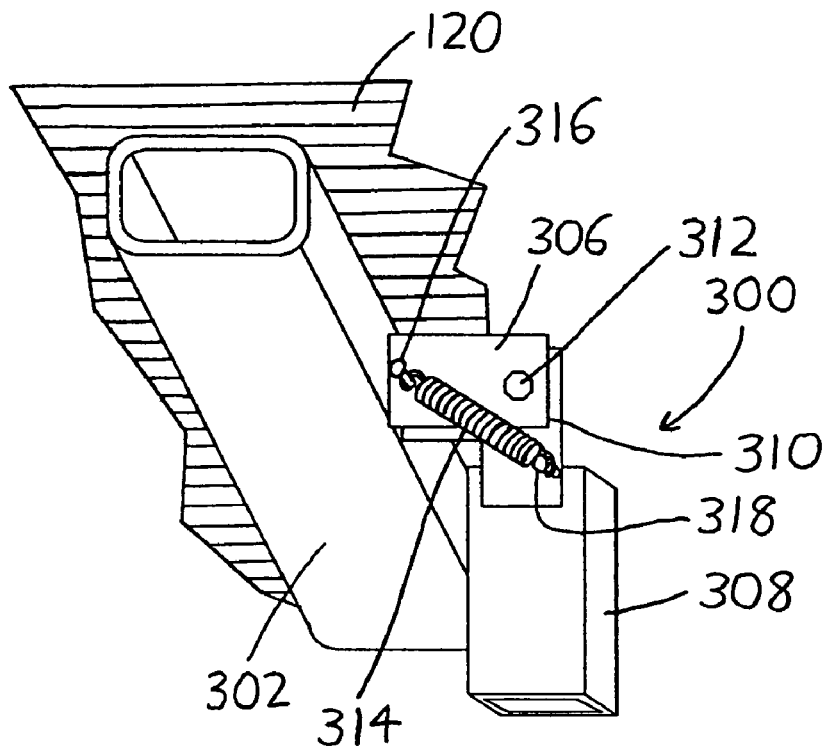
FIGS. 3a and 3b are perspective views of a leg mounting structure 300 for the legs 130 shown in FIG. 2.

The trailer 100 of FIG. 1 (and thus the assembly hall 200 of FIG. 2) may be formed from any common full trailer (i.e., a trailer which is fully supported by wheels), though it could instead take the form of a semi trailer (i.e., a trailer wherein the back end rests on wheels and the front end is supported by a tractor truck) or other trailer. Such trailers 100, or their components, may be obtained from manufacturers such as Stoughton Trailers (Stoughton, Wis., USA), Great Dane (Savannah, Ga., USA), Heil (Chattanooga, TN, USA), and others. It is also possible to simply fabricate the trailer 100/assembly hall 200 from appropriate components and materials rather than from a premanufactured trailer.

The assembly hall 200 may be constructed from the trailer 100 by removing its sidewalls 116 and then pivotally mounting them to the trailer roof sides 114 (assuming that the trailer sidewalls are to serve as trailer ceiling extensions 116, as in FIG. 2). As previously noted, where the trailer sidewalls 116 form trailer ceiling extensions, the trailer sidewalls/ceiling extensions 116 may pivot upwardly to form a continuous ceiling in conjunction with the trailer roof 112. If the trailer sidewalls 116 are instead to serve as trailer floor extensions 120, the sidewalls would instead need to be mounted to the trailer floor sides 110, thereby allowing them to pivot downwardly to define a continuous floor for the assembly hall 200 in conjunction with the trailer floor 106. In either case, the pivotal mounting can be formed (for example) by welding clevis-type ears (not shown in the drawings) to the trailer roof sides 114 (or floor sides 110), and to corresponding edges of the trailer sidewalls 116, and then inserting hinge pins and affixing them in place by bolts, cotter pins, or the like. If desired, the seam defined between the trailer roof 112 and the ceiling extensions 116—which may have a gap depending on the type of hinging arrangement being used—may be sealed to better protect against seepage of rain by applying a flexible waterproof strip along the length of the seam between the trailer roof 112 and the ceiling extensions 116. If desired, a similar arrangement can be used at the seam between the trailer floor extensions 120 and the trailer floor 106 to provide a smooth and crack-free transition.

In the assembly hall 200 of FIG. 2, the trailer floor extensions 120 pivot upwardly to rest between the trailer sidewalls/ceiling extensions 116 when the sidewalls/extensions 116 are folded downwardly. These floor extensions 120 may be formed of any suitable material, with rib-reinforced plywood (preferably encased within sheet metal) being an inexpensive option. The trailer floor extensions 120 may be pivotally affixed to the trailer floor sides 110 in a manner similar to the attachment of the sidewalls/ceiling extensions 116 to the trailer roof sides 114. However, the trailer floor extensions 120 should have somewhat smaller dimensions than the trailer sidewalls/ceiling extensions 116, since the floor extensions 120 are to nest in their folded state between the sidewalls/ceiling extensions 116, and also between the trailer front and rear walls 102 and 104 and between the trailer floor 106 and roof 112. It may also be necessary or desirable to cut away the edges of the trailer floor sides 110 prior to pivotally affixing the trailer floor extensions 120. This ensures that when the trailer floor extensions 120 are pivoted upwardly, and the trailer sidewalls/ceiling extensions 116 are pivoted downwardly about the floor extensions 120, the trailer sidewalls/ceiling extensions 116 can be oriented at least substantially vertically, without interference from the floor extensions 120 (i.e., without being pushed outwardly by the floor extensions 120). In similar respects, if the trailer sidewalls 116 in FIG. 1 are used to form the trailer floor extensions 120 rather than the ceiling extensions, with the ceiling extensions being nested between the floor extensions 120 when all extensions 116 and 120 are in their folded state, it may be necessary to cut away portions of the trailer roof sides 114 to ensure such nesting occurs without interference.

Regardless of whether the sidewalls 116 fold upwardly to define ceiling extensions 116 (as in FIG. 2) or downwardly to define floor extensions 120 (as in alternative unshown versions of the invention), it is useful to provide some means for firmly latching the sidewalls 116 in their folded state about any underlying extensions 120/116 as illustrated in FIG. 1. As examples, apertures may be provided in the sidewalls 116 which allow them to be rapidly bolted to any underlying extension 120/116, or clips, buckles, latches, tie-downs, or other structures might be provided which hold the sidewalls 116 in their folded state until released by a user.

Figure 3B:
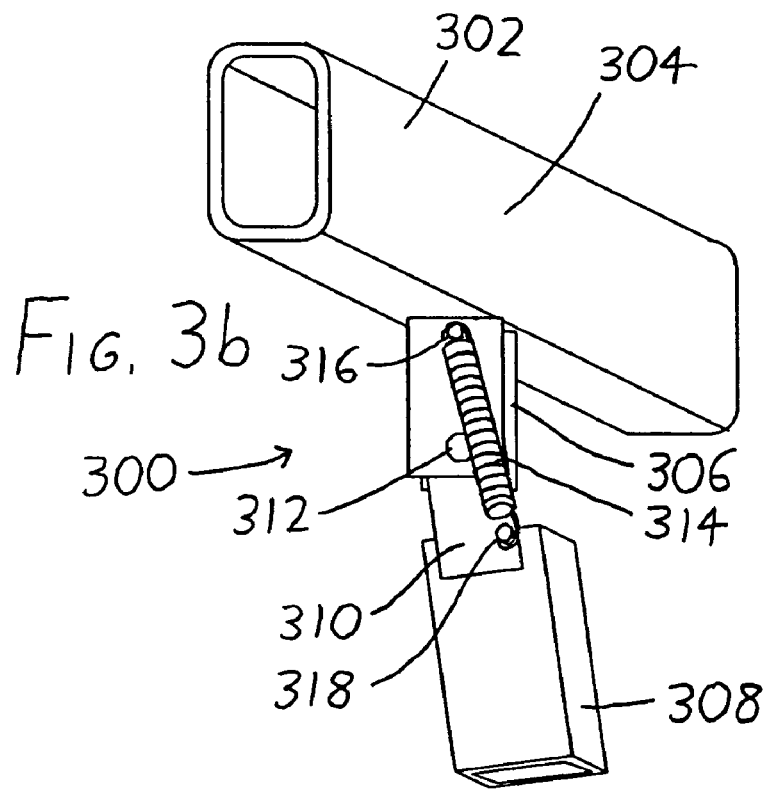

The floor extension legs 130, which help to support the floor extensions 120, have a height such that when the trailer 100 is placed on a substantially horizontal surface, the legs 130 will maintain the trailer floor extensions 120 aligned substantially horizontally adjacent the trailer floor 106. A particularly preferred arrangement is to have the tops of the legs 130 pivotally affixed to the trailer floor extensions 120 so that when the floor extensions 120 are pivoted into their unfolded state, the floor extension legs 130 will also automatically unfold (either by gravity and/or by spring or other actuation), with the legs 130 resting in a substantially vertical position (as depicted in FIG. 2). An arrangement of this nature is partially depicted in FIGS. 3a and 3b, wherein a leg mounting structure 300 which is associated with each floor extension leg 130, but which is not clearly visible in FIG. 2, is shown. Referring to FIG. 3a, wherein a section of the trailer floor extension 120 is shown in the unfolded state in which it is illustrated in FIG. 2, an extension leg mount 302 is affixed to the trailer floor extension 120 at its top surface 304 (which is only visible in FIG. 3b). The extension leg mount 302 includes a pair of parallel spaced mount ears 306 extending therefrom in a direction parallel to the trailer floor extension 120. An extension leg sleeve 308, which telescopically receives an extension leg 130 (not shown) therein, has a sleeve ear 310 extending therefrom to rest between the mount ears 306. The sleeve ear 310 is pivotally fixed between the mount ears 306 by a pivot 312, which may take the form of a bolt. Thus, when the trailer floor extension 120 is pivoted to its folded (substantially vertical state)—as in FIG. 1, though the trailer floor extension 120 is not shown in FIG. 1—the top surface 304 of the extension leg mount 302 becomes vertically oriented (with the attached trailer floor extension 120 not being shown in FIG. 3b), and the extension leg sleeve 308 pivots about the pivot 312 by the force of gravity to extend substantially vertically (and substantially parallel to the unshown adjacent trailer floor extension 120). To assist in helping the extension leg sleeve 308 (and the unshown extension leg 130 therein) in swinging between the unfolded/extended state of FIG. 3a, and the folded/retracted state of FIG. 3b, a spring 314 is preferably mounted to extend between a mount spring pin 316 and a sleeve spring pin 318. When the extension leg sleeve 308 is in the unfolded/extended state of FIG. 3a, the spring 314, whose tension tries to urge the spring 314 into the shortest possible length, tries to pivot the extension leg sleeve 308 against the extension leg mount 302; however, it is prevented from doing so because the mount ears 306 bear stops therebetween (not shown) which prevent the sleeve ear 310 from pivoting further past the vertical orientation of FIG. 3a toward the extension leg mount 302. The spring 314 thereby helps to pull the extension leg sleeve 308 (and the unshown extension leg 130 therein) into a stable vertical orientation as the trailer floor extension 120 is unfolded into an at least substantially horizontal state. However, the spring 314 is not strong enough to maintain the extension leg sleeve 308 in this orientation when the trailer floor extension 120 is folded (particularly when the weight of the unshown extension leg 130 within the extension leg sleeve 308 is considered), and thus the extension leg sleeve 308 (and the unshown extension leg 130 therein) are not prevented from folding into the state shown in FIG. 3b. Regarding this state, note that while the mount spring pin 316 is mounted generally in line with the pivot 312 and the axis of the extension leg sleeve 308, the sleeve spring pin 318 is mounted off-axis; thus, when the extension leg sleeve 308 folds from the state of FIG. 3a toward the state shown in FIG. 3b, the spring 314 will attempt to urge the extension leg sleeve 308 past a vertical orientation, and against the trailer floor extension 120 (unshown in FIG. 3b). This is why the extension leg sleeve 308 is shown at an angle slightly off the vertical in FIG. 3b. This helps to maintain the extension leg sleeve 308 (and the unshown extension leg 130 therein) against the folded trailer floor extension 120 (unshown in FIG. 3b) so that it does not swing outwardly and inwardly and bang against the trailer floor extension 120 when the trailer 100/assembly hall 200 is transported. Thus, it should be realized that the locations of the mount spring pin 316 and sleeve spring pin 318 help the spring 314 to urge the extension leg sleeve 308 (and the unshown extension leg 130 therein) into the vertical supporting state of FIG. 3a, wherein the extension leg sleeve 308 and its extension leg 130 support the trailer floor extension 120, and also help the spring 314 to urge the extension leg sleeve 308 (and the unshown extension leg 130 therein) into the vertical folded state of FIG. 3a, wherein the extension leg sleeve 308 and its extension leg 130 are held folded against the trailer floor extension 120 so that they do not flap and bang against the trailer floor extension 120.

Within the extension leg sleeve 308, the unshown extension leg 130 may be provided as a telescopically sliding member, and the extension leg sleeve 308 and extension leg 130 may then be pinned together to achieve a desired height. More preferably, the extension leg sleeve 308 and extension leg 130 together define a screw jack allowing the extension leg 130 to be adjustably cranked to a desired height.

Referring back to FIGS. 1 and 2, rather than forming the floor extension legs 130 as pivoting attachments to the floor extensions 120, it is also possible to form the floor extension legs 130 as members which are separate from the, and which are installed after the floor extensions 120 are unfolded, perhaps by fitting their tops into pockets formed in the trailer floor extensions 120. In this arrangement, the legs 130 will be maintained in place between the ground and the floor extensions 120 by the weight of the floor extensions 120, and by the pockets preventing horizontal slippage of the tops of the legs 103.

Because the ceiling and floor extensions 116 and 120 can be heavy and difficult to manually unfold, it is useful to provide actuators, such as the fluid actuators 128 (i.e., pneumatic or hydraulic cylinders), which can be activated to automatically fold and unfold the ceiling and floor extensions 116 and 120. In FIG. 2, one fluid actuator 128 is shown for each of the ceiling extensions 116 and floor extensions 120, with the actuators 128 being affixed between the extensions 116/120 and the interior of the trailer rear wall 104. However, fluid actuators 128 may additionally or instead be placed on the trailer front wall 102, or elsewhere if desired. To prevent interference between the actuators 128 and the extensions 116/120 as the extensions 116/120 are actuated between their folded and unfolded states, portions of the perimeters of the extensions 116/120 may need to be cut away, and/or the mounted ends of the actuators 128 may need to be affixed with different spacings from the trailer rear wall 104. The arrangement of the fluid actuators 128 depicted in FIG. 2 is merely exemplary, and it should be understood that the actuators 128 could instead actuate linkages which in turn fold/unfold the extensions 116/120. Further, to attain a compact actuating arrangement, one or both ends of the actuators 128 may need to be mounted on slides which move along the extensions 116/120 and/or on the trailer walls 102/104.

The struts 132 usefully help to maintain the ceiling extensions 116 at their working height above the floor extensions 120, and they may take the form of elongated rods/tubes or beams. A simple arrangement for affixing the struts 132 in place is to define pockets 134 on one or both of the ceiling extensions 116 and floor extensions 120, with such pockets 134 perhaps being formed by depressions defined directly in the extensions 116/120 (as shown by the pockets 134 in FIG. 2) or by welding or otherwise affixing cup-like members to the perimeters of the extensions 116/120, so that the ends of the struts 132 may be fit into the pockets 134 to laterally restrain the ends of the struts 132 in place. The weight of the ceiling extensions 116 will then help to maintain the struts 132 between the ceiling and floor extensions 116 and 120. A particularly useful arrangement, not shown in the drawings, is to situate radially protruding ears or flanges at the ends of the struts 132, and to have the mouths of the pockets 134 bear slots which accommodate the ears/flanges when the ends of the struts 132 are inserted therein. However, when the struts are then rotated so that the ears/flanges are no longer aligned with the slots, the ends of the struts 132 cannot be withdrawn from the pockets 134 (unless they are again rotated so that the ears/flanges are aligned with the slots). An alternative or additional arrangement which can be useful is to restrain one of the ends of each strut 132 to one of the ceiling extensions 116 (or to one of the floor extensions 120) by a pivotable connection, such as by a universal joint or short length of chain. Each strut will then be pivotally linked to one of the extensions 116/120, and when the extensions 116 and 120 are placed in their unfolded states, each strut 132 may be pivoted with respect to the extension 116/120 to which it is linked to extend to the opposing extension 120/116, and may then have its free end slipped into a pocket defined in that extension 120/116.

The assembly hall 200 shown in FIG. 2 includes platforms 140 affixed to the floor extensions 120 such that when the floor extensions 120 are unfolded, the platforms 140 define benches and tables. Railings 138 are also firmly affixed to the floor extensions 120 so that they bound the unfolded floor extensions 120. As a result, the assembly hall 200 is in substantially ready-to-use condition when it is unfolded. While the railings 138 and platforms 140 are shown fixed in rigid relation to the floor extensions 120, they could instead be provided as separate components which are installable on (and removable from) the floor extensions 120 once unfolded; for example, picnic tables, or folding tables and chairs, could be stacked within the interior of the trailer 100, and these could be moved into their desired locations on the floor extensions 120 once unfolded. The railings 138 could similarly be provided as separate members which are bolted or otherwise installed in place. It is also possible to form the supporting stanchions/legs of the railings 138 and platforms 140 of pivoting linkages, such that the railings 138 and platforms 140 might fold substantially flat with respect to the floor extensions 120, and may then be unfolded into their erect positions after the floor extensions 120 are unfolded.

The ramp 136 may be provided as a feature of the trailer 100 when it is purchased (i.e., prior to forming the folding sidewalls 116 and any ceiling/floor extensions 116/120), or if it is not present, it may be formed by cutting it into the trailer rear wall 104 (assuming the trailer rear wall 104 is formed as a single piece). Many trailer rear walls 104 are formed of a pair of opposing openable rear doors, and if these are present, the trailer rear wall 104 may need to be replaced with one bearing a ramp 136, or with one into which a ramp 136 may be cut. Alternatively, it may also be possible to maintain any opening rear doors on the trailer rear wall 104, and provide the ramp 136 as a folding member (similar to the extensions 116 and 120) which may fold downwardly from the rear end 108 of the trailer floor 106. Staircases (rigid or folding) or other structures could be used instead to allow easy ingress to the assembly hall 200. If desired, the ramp 136 may also be actuatable between folded and unfolded positions by use of fluid actuators (not shown in FIG. 2), and/or it may include its own railings.

Note that a basic exemplary version of the invention is described above and shown in the drawings to illustrate possible features of the invention and possible ways in which these features may be arranged. Apart from combining the different features in varying ways, other modifications are also considered to be within the scope of the invention. Following is an exemplary list of such modifications.

The trailer 100/assembly hall 200 may contain other amenities which make it useful for meetings and activities in a variety of weather and lighting conditions, such as lights on the lower surfaces of the trailer ceiling extensions 116 which shine downwardly toward the floor extensions 120 to provide illumination during nighttime use. These lights may remain fixed to the trailer ceiling extensions 116 so that they ride on the trailer ceiling extensions 116 when the trailer ceiling extensions 116 are pivotally moved, and they may be conveniently powered by the battery of the tractor truck (or by separate batteries, a generator, or standard electrical sockets about the surroundings of the trailer 100/assembly hall 200).

If the trailer 100/assembly hall 200 is to be used in conditions where there may be many mosquitoes or other insects, the areas of the assembly hall 200 between the perimeters of the ceiling extensions 116 and floor extensions 120 may be closed by netting to deter insect entry. The door in the trailer rear wall 104 defined by the ramp 136 could also have netting draped over it (preferably with overlapping flaps of a zippered entry, as in a camping tent).

Similarly, if the trailer 100/assembly hall 200 is to be used in cold or overly warm conditions, the areas of the assembly hall 200 between the perimeters of the ceiling extensions 116 and floor extensions 120 (and the door in the trailer rear wall 104 defined by the ramp 136) may be closed by heavy canvas, clear (or other) plastic sheeting, or other fabric-like materials, and the interior of the assembly hall 200 may be heated or cooled.

While the trailer 100/assembly hall 200 shown in the drawings has each trailer sidewall 116 fold upwardly in its entirety to define a trailer ceiling extension 116 which extends across the entirety of each roof side 114, it is also possible that less than the entirety of each sidewall 116 could fold. As an example, the front quarter of each sidewall 116 might be formed separately from the rear three-quarters, with the rear portion unfolding and the front portion remaining fixed to the trailer floor 106 in the folded state. Thus, the front quarter of the trailer 100 will effectively remain in its original position, with the rear three-quarters forming the assembly hall 200. This front portion could be used for storage, restrooms (such as portable chemical toilets), placement of a performance stand or podium, or other purposes.

In another version of the assembly hall which is not depicted in the drawings, only one of the opposing sides of the trailer 100 unfolds (i.e., only one sidewall 116 unfolds as a ceiling or floor extension, and is only paired with one other opposing floor or ceiling extension). In this case, the opposing trailer sidewall 116, the floor and roof 106 and 112, and the front and rear walls 102 and 104 remain as a partially enclosed space from which the unfolding sidewall 116 and its opposing floor (or ceiling) extension extend. Such an arrangement may be particularly useful where the assembly hall is to be used as a mobile snack bar or the like, since the enclosed portion of the assembly hall can house cooking, refrigeration, and other equipment which might preferably be left at least partially enclosed or otherwise sheltered at all times.

Other versions of the assembly hall might also have their front walls 102 fold downwardly (or upwardly), perhaps in conjunction with a corresponding ceiling or floor extension, to add further floor space at the front of the trailer 100. This space might possibly serve as the presentation/performance space, for viewing by attendees sitting elsewhere in the assembly hall. In this case, supports may need to be provided to support the trailer roof 112, as by providing beams at the lateral sides of the front walls 102. A similar arrangement can also (or alternatively) be used for the trailer rear wall 104 (though in this case the ramp 136 is preferably omitted). It is also possible for the trailer rear wall 104 be used in its entirety to form a folding ramp 136, though in this case it would also be necessary to provide beams or other supports for the trailer roof 112 at the rear of the trailer 100.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A mobile assembly hall which converts between:
    a. a trailer having:
        (1) a trailer front wall and an opposing trailer rear wall;
        (2) a trailer roof extending between the trailer front wall and the trailer rear wall;
        (3) a trailer floor having floor sides extending between the trailer front wall and trailer rear wall, the trailer floor being at least substantially horizontal;
        (4) wheels beneath the trailer floor whereby the trailer may be rolled between locations;
        (5) at least substantially vertical trailer sidewalls extending between the trailer front wall and trailer rear wall and also between the trailer roof and trailer floor, the trailer sidewalls being pivotable into an unfolded state wherein the trailer sidewalls are oriented at least substantially horizontally;
    and
    b. an assembly hall wherein:
        (1) the trailer roof has ceiling extensions extending laterally outwardly from its opposite sides, wherein the trailer roof and ceiling extensions combine to define an assembly hall roof;
        (2) the trailer floor has floor extensions extending laterally outwardly from its floor sides, wherein
            (i) the trailer floor and floor extensions combine to define an assembly hall floor,
            (ii) the floor extensions bear railings which bound at least a portion of the floor extensions, the railings being defined by elongated beams spaced above the floor extensions;
            (iii) the floor extensions are pivotable into a folded state in which the floor extensions are oriented at least substantially vertically, and
            (iv) the railings remain in fixed relation to the floor extensions when the floor extensions are pivoted into the folded state;
        (3) at least one of the ceiling extensions and the floor extensions is defined by the trailer sidewalls pivoted into the unfolded state.

2. The mobile assembly hall of claim 1 wherein:
    a. the ceiling extensions are defined by the trailer sidewalls;
    b. the floor extensions are pivotable into a folded state in which the floor extensions are:
        (1) oriented at least substantially vertically, and
        (2) situated between the trailer sidewalls.

3. The mobile assembly hall of claim 1 wherein the floor extensions of the assembly hall bear legs extending downwardly to the ground.

4. The mobile assembly hall of claim 3 wherein the legs are pivotally affixed to the floor extensions.

5. The mobile assembly hall of claim 1 wherein the assembly hall:
    a. includes pockets defined in the floor extensions and ceiling extensions, wherein the pockets of the floor extensions face the pockets of the ceiling extensions;
    b. further comprises struts, each strut being insertable into one of the pockets in the floor extensions and one of the facing pockets in the ceiling extensions, thereby maintaining the floor extensions and the ceiling extensions in spaced relation.

6. The mobile assembly hall of claim 1:
    a. wherein at least one of:
        (1) the trailer floor extensions, and
        (2) the trailer ceiling extensions,
        bear pockets defined thereon,
    b. the assembly hall further comprises struts, each strut extending at least substantially vertically between the trailer floor extensions and the trailer ceiling extensions to maintain them in spaced relation, wherein each strut has a strut end removably inserted in one of the pockets.

7. The mobile assembly hall of claim 1 further comprising fluid actuators extending between the ceiling extensions of the assembly hall and at least one of:
   a. the trailer front wall, and
   b. the trailer rear wall,
   of the trailer.

8. A mobile assembly hall comprising a trailer having:
   a. a trailer front wall and an opposing trailer rear wall;
   b. a trailer roof having roof sides extending between the trailer front wall and trailer rear wall;
   c. a trailer floor having floor sides extending between the trailer front wall and trailer rear wall, the trailer floor being at least substantially horizontal;
   d. wheels beneath the trailer floor whereby the trailer may be rolled between locations;
   e. trailer floor extensions, each bearing pockets and being pivotally movable between:
      (1) an unfolded state wherein the floor extension extends laterally outwardly from the trailer floor in an at least substantially horizontal orientation;
      (2) a folded state wherein the floor extension is folded at least 80 degrees inwardly toward the trailer floor from the unfolded state;
   f. trailer ceiling extensions, each bearing pockets and being pivotally movable between:
      (1) an unfolded state wherein the ceiling extension extends laterally outwardly from the trailer roof in an at least substantially horizontal orientation;
      (2) a folded state wherein the ceiling extension is folded at least 80 degrees inwardly toward the trailer roof from the unfolded state,
      and wherein the pockets of the floor extensions face the pockets of the ceiling extensions when the floor and ceiling extensions are in their unfolded state;
   struts, each strut being insertable into one of the pockets in the trailer floor extensions and one of the facing pockets in the trailer ceiling extensions when the trailer floor extensions and trailer ceiling extensions are in the unfolded state, thereby maintaining the trailer floor extensions and the trailer ceiling extensions in spaced relation.

9. The mobile assembly hall of claim 8 wherein one of:
   a. the trailer floor extensions, or
   b. the trailer ceiling extensions,
   defines trailer sidewalls when in the folded state, the trailer sidewalls extending between the trailer roof and trailer floor.

10. The mobile assembly hall of claim 8 wherein:
   a. the trailer ceiling extensions define trailer sidewalls when in the folded state, the trailer ceiling extensions extending between the trailer roof and trailer floor;
   b. the trailer floor extensions, when in their folded state, rest between the trailer sidewalls defined by the trailer ceiling extensions.

11. The mobile assembly hall of claim 8 wherein the trailer floor extensions, when in the unfolded state, define a continuous horizontal assembly hall floor in combination with the trailer floor.

12. The mobile assembly hall of claim 8 wherein the trailer floor extensions, when in the unfolded state, bear legs supporting the trailer floor extensions above the ground.

13. The mobile assembly hall of claim 12 wherein the legs are pivotally affixed to the trailer floor extensions.

14. The mobile assembly hall of claim 8 wherein the trailer floor extensions support elongated beams spaced from the trailer floor extensions, the beams defining railings which bound at least a portion of the trailer floor extensions when the trailer floor extensions are in the unfolded state.

15. The mobile assembly hall of claim 8:
   a. wherein at least one of:
      (1) the trailer floor extensions, and
      (2) the trailer ceiling extensions,
      bear pockets defined thereon,
   b. the mobile assembly hall further comprises struts, each strut:
      (1) having opposing ends wherein at least one of the ends rests within one of the pockets,
      (2) extending between the trailer floor extensions and the trailer ceiling extensions to maintain them in spaced relation,
      when the trailer floor extensions and trailer ceiling extensions are in the unfolded state.

16. The mobile assembly hall of claim 8 wherein at least a portion of the trailer rear wall folds downwardly to the ground to define a ramp leading from the ground to the trailer floor.

17. The mobile assembly hall of claim 8 further comprising fluid actuators extending between the trailer ceiling extensions and at least one of:
   a. the trailer front wall, and
   b. the trailer rear wall.

18. A mobile assembly hall comprising:
   a. a trailer floor having opposing front and rear ends, and opposing trailer floor sides;
   b. a trailer floor extension having an inner side and an opposing outer side, the inner side being pivotally mounted to one of the trailer floor sides, wherein the trailer floor extension is pivotable from:
      (1) an unfolded state wherein the trailer floor extension extends at least substantially horizontally adjacent the trailer floor, to
      (2) a folded state wherein the outer side of the trailer floor extension is pivoted toward the trailer floor;
   c. legs extending downwardly from the trailer floor extension to the ground when the trailer floor extension is in its unfolded state;
   d. platforms situated upon, and spaced horizontally above, the trailer floor extension when the trailer floor extension is in its unfolded state, and wherein the platforms:
      (1) are sized and configured to define seats, and
      (2) remain fixed to the trailer floor extension when it is pivoted into its folded state;
   e. a trailer roof opposite the trailer floor, the trailer roof having opposing front and rear ends, and opposing trailer roof sides;
   f. a trailer ceiling extension having an inner side and an outer side, the inner side being pivotally mounted to one of the trailer roof sides, wherein the trailer ceiling extension is pivotable from:
      (1) a folded state wherein the trailer ceiling extension extends between the trailer roof and the trailer floor, and
      (2) an unfolded state wherein:
         i. the outer side of the trailer ceiling extension is pivoted away from the trailer roof, and
         ii. the trailer ceiling extension rests above the trailer floor extension when the trailer floor extension is in its unfolded state.

19. The mobile assembly hall of claim 18 wherein the legs are pivotally connected to the trailer floor extensions.

20. The mobile assembly hall of claim 18 wherein the trailer floor extension, when in its unfolded state, defines a continuous horizontal assembly hall floor in combination with the trailer floor.

21. The mobile assembly hall of claim 18 wherein the trailer floor extension supports elongated beams spaced from the trailer floor extension, the beams defining railings which bound at least a portion of the trailer floor extension when the trailer floor extension is in its unfolded state.

22. The mobile assembly hall of claim 18:
  a. wherein:
    (1) the trailer floor extension and trailer ceiling extension each bear pockets,
    (2) the pockets of the floor extension face the pockets of the ceiling extension when the floor and ceiling extensions are each in their unfolded states;
  b. the mobile assembly hall further comprises struts, each strut being insertable into one of the pockets in the trailer floor extension and one of the facing pockets in the trailer ceiling extension when the trailer floor extension and trailer ceiling extension are each in their unfolded states.

23. The mobile assembly hall of claim 18:
  a. wherein at least one of:
    (1) the trailer floor extension, and
    (2) the trailer ceiling extension,
    bears pockets defined thereon,
  b. the mobile assembly hall further comprises struts, each strut extending:
    (1) at least substantially vertically from one of the pockets, and
    (2) between the trailer floor extension and the trailer ceiling extension,
    to maintain them in spaced relation when the trailer floor extension and trailer ceiling extension are each in their unfolded states.

24. A mobile assembly hall which converts between:
  a. a trailer having:
    (1) a trailer front wall and an opposing trailer rear wall;
    (2) a trailer roof extending between the trailer front wall and trailer rear wall;
    (3) a trailer floor having floor sides extending between the trailer front wall and trailer rear wall, the trailer floor being at least substantially horizontal;
    (4) wheels beneath the trailer floor whereby the trailer may be rolled between locations;
    (5) at least substantially vertical trailer sidewalls extending between the trailer front wall and trailer rear wall and also between the trailer roof and trailer floor, the trailer sidewalls being pivotable into an unfolded state wherein the trailer sidewalls are oriented at least substantially horizontally;
    (6) pockets defined in at least one of the trailer floor extensions and the trailer ceiling extensions; and
    (7) struts having opposing strut ends, the strut ends being removably insertable in the pockets;
  and
  b. an assembly hall wherein:
    (1) the trailer roof has ceiling extensions extending laterally outwardly from its opposing sides, wherein the trailer roof and ceiling extensions combine to define an assembly hall roof;
    (2) the trailer floor has floor extensions extending laterally outwardly from its floor sides, wherein the trailer floor and floor extensions combine to define an assembly hall floor;
    (3) at least one of the ceiling extensions and the floor extensions is defined by the trailer sidewalls pivoted into the unfolded state; and
    (4) each strut:
      (i) extends at least substantially vertically between the trailer floor extensions and the trailer ceiling extensions to maintain them in spaced relation, and
      (ii) has at least one of its strut ends fit in one of the pockets.

* * * * *